G. A. BARNES.
TOOL HOLDER.
APPLICATION FILED OCT. 13, 1908.
945,675.
Patented Jan. 4, 1910.
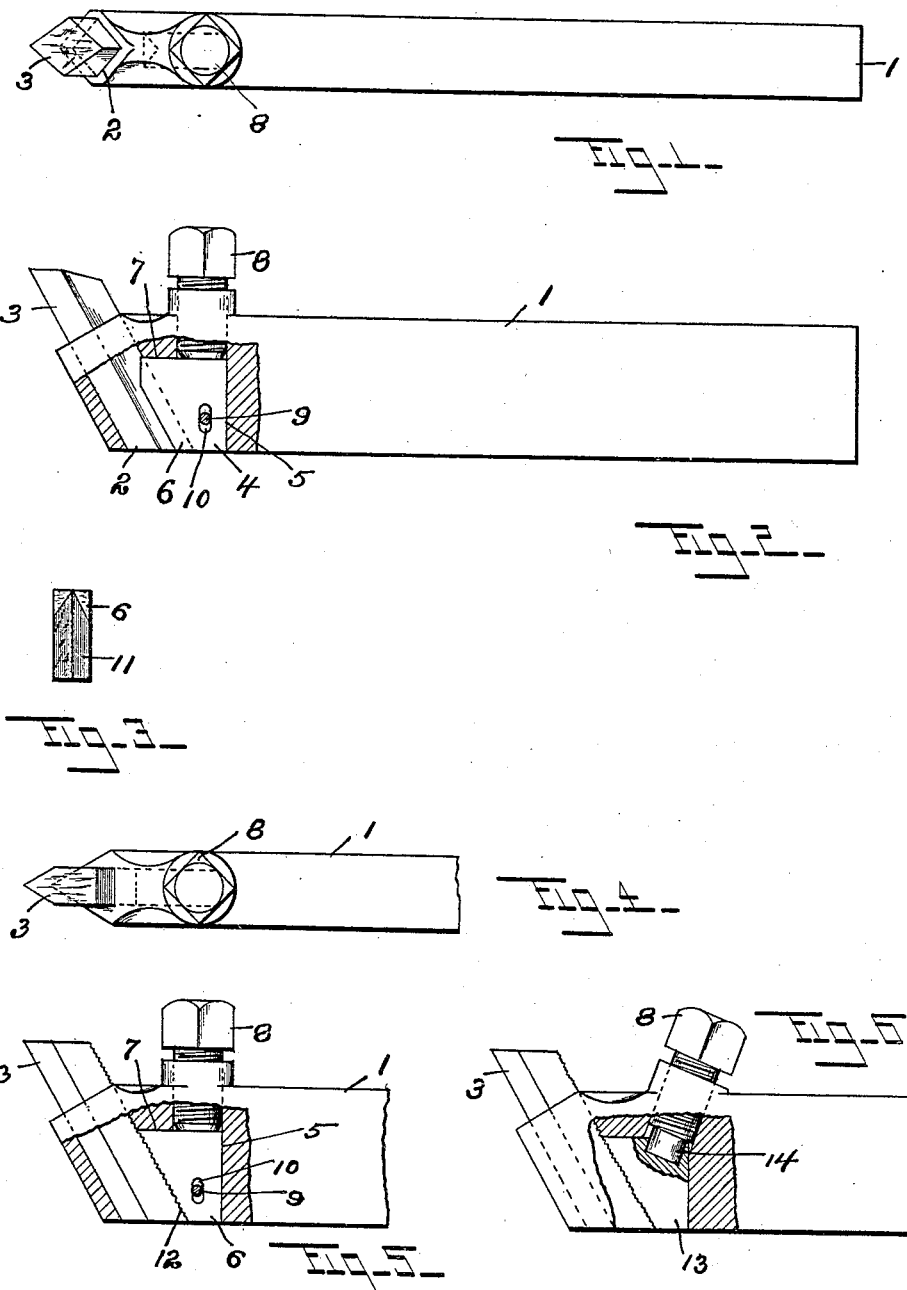
WITNESSES:
INVENTOR.
George A. Barnes
BY George E. Hall
ATTORNEY.

UNITED STATES PATENT OFFICE.

GEORGE A. BARNES, OF NEW HAVEN, CONNECTICUT, ASSIGNOR TO THE READY TOOL COMPANY, OF NEW HAVEN, CONNECTICUT, A CORPORATION OF CONNECTICUT.

TOOL-HOLDER.

945,675.      Specification of Letters Patent.      Patented Jan. 4, 1910.

Application filed October 13, 1908. Serial No. 457,464.

*To all whom it may concern:*

Be it known that I, GEORGE A. BARNES, a citizen of the United States, residing at New Haven, in the county of New Haven and State of Connecticut, have invented certain new and useful Improvements in Tool-Holders, of which the following is a specification, reference being had therein to the accompanying drawings.

My invention relates to new and useful improvements in tool holders, and has for its object, among other things, to provide a device that will adjustably and rigidly hold a cutting tool, and one that may be produced at the minimum cost.

To these, and other ends, my invention consists in the tool holder having certain details of construction and combinations of parts as will be hereinafter described and more particularly pointed out in the claim.

Referring to the drawings, in which like numerals of reference designate like parts in the several figures; Figure 1 is a plan view of my improved tool holder complete; Fig. 2 is a side elevation thereof partly in section; Fig. 3 is a front elevation of the locking wedge; Fig. 4 is a plan view of my device illustrating a modified form of cutter bar; Fig. 5 is a side elevation thereof partly in section; and Fig. 6 is a similar view illustrating a modified form of locking wedge.

In the practice of my invention I provide a body member 1 having a cutter opening 2 therein, which extends from the top to the bottom thereof and at an angle inclined rearwardly from the front end. Within this opening is a cutter bar 3, the cross section of which is substantially the same as that of the opening 2. In Figs. 1 and 2 the cutter bar is square in cross section to form what is known as a diamond point tool, and in Fig. 4 is flat on its side and rear faces with a pointed front face, forming what is known as a thread tool.

In the underside of the body member, and extending laterally from the opening 2 is a pocket 4 and within which is the locking wedge 6. This wedge is preferably formed from a piece of flat steel having flat sides parallel with each other, a grooved front edge 11 so as to fit over the edge of the cutter bar, a rounded rear face that contacts with the face 5 of the pocket 4, and a flat top 7.

Through the top of the body member a screw 8 is threaded, the lower end of which engages the top 7 of the locking wedge. For economy in manufacture I prefer to have the rear edge of the hole through which the screw 8 is threaded in line with the face 5 of the pocket 4, so that when the body member is made from solid stock instead of being cast, the drill that cuts the hole for the screw 8 will also form the face 5 at the same operation.

Disengagement of the locking wedge 6 from the body member is prevented by a pin 9 that passes through a slot 10 in the wedge that permits of a limited movement of the wedge within the pocket 4.

In operation the cutter bar 3 is held rigid within the opening 2 by the wedge 6.

In Figs. 4 and 5 the cutter bar is slightly roughened upon its flat rear face, as is also the front face 12 of the locking wedge 6, so as to provide surfaces that will engage each other with sufficient friction to prevent the cutter bar from slipping.

In Fig. 6 the screw 8 is threaded through the body member at an angle to the rear face of the wedge 13, and the tip 14 thereof enters a hole in said wedge.

There are minor changes and alterations that can be made within my invention, aside from those herein suggested, and I would therefore have it understood, that I do not limit myself to the exact construction herein shown and described, but claim all that falls fairly within the spirit and scope of my invention.

Having described my invention, what I claim as new and desire to secure by Letters Patent, is:—

In a tool holder, a body member having an opening in one end, with a pocket in the underside thereof connected with said opening, and a threaded hole extending from the top side of the body member to said pocket, the said pocket having parallel sides and a rounded end opposite to said opening, the center of said rounded end and threaded hole being substantially coincident; a cutter bar movable in said opening; a locking wedge within said pocket having parallel sides and a rounded end, with a slot therein substantially parallel with said rounded end; a pin fixed in said body member and passing through said slot; and a screw within said threaded hole engaging the top of said locking wedge.

In testimony whereof I affix my signature in presence of two witnesses.

GEORGE A. BARNES.

Witnesses:
GEORGE E. HALL,
WALLACE S. MOYLE.